United States Patent Office 3,219,615
Patented Nov. 23, 1965

3,219,615
NOVEL PLASTICIZED COMPOSITIONS
Ray Phillips, Murray Hill, N.J., assignor to FMC Corporation, New York, N.Y., a corporation of Delaware
No Drawing. Original application Oct. 18, 1961, Ser. No. 145,989, now Patent No. 3,120,545, dated Feb. 4, 1964. Divided and this application Apr. 5, 1963, Ser. No. 270,794
1 Claim. (Cl. 260—30.4)

This application is a division of my copending application Serial No. 145,989, filed October 18, 1961, now Patent No. 3,120,545.

This invention relates to novel plasticized compositions, and more particularly, it relates to poly(vinyl alcohol) plasticized with tris(tetrahydrofurfuryl) phosphate.

Poly(vinyl alcohol) polymers are useful products which have excellent properties such as solvent resistance, tensile strength, tear resistance, and flexibility. These polymers are useful in the preparation of many adhesives, binders and films. The property of poly(vinyl alcohol) polymers which leads to their greatest potential utility is their water-solubility. In many applications in which water resistance is not necessary, these polymers may be preferred since they can be handled as aqueous solutions, thus eliminating the necessity for organic solvents. Also, there are many applications in which a water-soluble polymer is specifically required. For example, these polymers are particularly useful in the preparation of water-soluble films, which can be used for packaging measured amounts of commercial products such as soap, detergent, bluing, bath salts, disinfectants, insecticidal compositions, etc. In this application, the package containing the measured amount of product is dissolved in a specified quantity of water to make up a solution of desired concentration, without the contents of the package ever touching the users hands. However, this potential use for poly(vinyl alcohol) has not as yet been fully realized, because no completely satisfactory plasticizer has been found.

Conventional plasticizers for poly(vinyl alcohol), such as glycerine, ethylene glycol and triethylene glycol, act as plasticizers through a mechanism involving the fact that they are humectants. These compounds absorb and retain a controlled amount of water which acts as the actual plasticizer. However, when these plasticized polymers are used as packaging films, they have the disadvantage of being affected by changes in humidity which result in changes in physical properties such as tackiness, hardness, chemical resistance, etc. For example, these films become soft when subjected to high humidity conditions and tend to rupture easily. Furthermore, these conventional plasticizers are nutrients which support fungus and mold growth on the surface of the film. Accordingly, there is a need for a true plasticizer for poly(vinyl alcohol) which is not a humectant.

It is an object of this invention to provide a true plasticizer for poly(vinyl alcohol).

It is another object to provide a water-soluble plasticizer for poly(vinyl alcohol) which is not affected by changes in temperature and humidity.

It is another object to provide a plasticizer for poly(vinyl alcohol) which is not a humectant.

These and other objects will become apparent from the following description of this invention.

I have discovered a new compound, tris(tetrahydrofurfuryl) phosphate, which surprisingly, despite its complex structure, is soluble in water, and is an excellent plasticizer for poly(vinyl alcohol). This novel ester has the unusual combination of properties of being completely compatible with poly(vinyl alcohol) and being water-soluble, while at the same time, not being a humectant. Thus, it can be used for making poly(vinyl alcohol) packaging films which will ultimately dissolve in water, but which otherwise have relatively stable properties, even when subjected to drastic changes in humidity and temperature. Moreover, this ester does not support fungus or mold growth.

Tris(tetrahydrofurfuryl) phosphate may be prepared by the reaction of tetrahydrofurfuryl alcohol with phosphorus oxychloride in the presence of an acid acceptor, such as triethylamine. The reaction is suitably carried out by mixing tetrahydrofurfuryl alcohol with trimethylamine in the presence of a solvent such as benzene, and adding phosphorus oxychloride dropwise while maintaining the reaction at 40–50° C. by cooling. When the reaction is complete, the triethylamine hydrochloride precipitate is filtered off, and the solvent is removed from the product by stripping under reduced pressure.

Another method by which tris(tetrahydrofurfuryl) phosphate may be prepared in higher purity is carried out by reacting tetrahydrofurfuryl alcohol with sodium metal to form the sodium alcoholate, and reacting this intermediate with phosphorus oxychloride to yield the desired product. The product may be recovered by treating the oil layer with soda ash and stripping to remove the solvent. The concentrated product is then filtered and distilled.

Poly(vinyl alcohol) polymers are prepared by the hydrolysis of poly(vinyl acetate). Therefore, these polymers may differ as to the degree of hydrolysis and as to molecular weight. For most applications, the polymer should be about 50–100% hydrolyzed and have a viscosity in the range of about 4–65 centiposies, measured as a 4% aqueous solution at 20° C. using the Hoeppler falling ball method. Poly(vinyl alcohol) is fully discussed by Smith in Vinyl Resins, Reinhold Plastics Applications Series, Reinhold Publishing Corp. (1958), New York.

Although the amount of plasticizer used with the poly(vinyl alcohol) will depend on the properties desired, generally about 20–40 parts per hundred parts of polymer are preferred. The plasticizer is readily blended with poly(vinyl alcohol) by adding the plasticizer to an aqueous solution of the polymer.

Tris(tetrahydrofurfuryl) phosphate is particularly useful as a plasticizer for poly(vinyl alcohol) packaging films. However, this ester can also be used as a plasticizer in the preparation of poly(vinyl alcohol) adhesives, binders and molded plastics. Tris(tetrahydrofurfuryl) phosphate is also compatible with many other resins and is useful in other applications, for example as a plasticizer in poly(vinyl acetate) cements, and in polystyrene and polyacrylic floor finishes. This ester also has surface active properties which make it useful as a leveling agent in various coating materials, and as an anti-foam agent. It is also useful as a coalescing agent for resin dispersions such as poly(vinyl acetate) emulsion coatings.

The following examples, illustrating the preparation of tris(tetrahydrofurfuryl) phosphate and its use as a plasticizer for poly (vinyl alcohol), are presented without any intention that the invention be limited thereto. All parts and percentages are by weight.

*Example 1*

Tris(tetrahydrofurfuryl) phosphate was prepared as follows: Two hundred twenty parts of tetrahydrofurfuryl alcohol and 222 parts of triethylamine, dissolved in 800 parts of benzene, were charged to a reactor and 101 parts of phosphorus oxychloride, dissolved in 200 parts of benzene, were added dropwise over a 30-minute period, while maintaining the reaction temperature at 40–60° C. The reaction mixture was stirred at this temperature for an additional 5-hour period. The triethylamine hydrochloride precipitate was filtered off, and the excess solvent was stripped off by reducing the pressure to 20 millimeters of mercury while warming. The procedure resulted in a yield of 208 parts of tris(tetrahydrofurfuryl) phosphate of approximately 91.6% purity.

*Analysis.*—Theoretical, C, 51.4; H, 7.78; P, 8.85. Found, C, 49.3; H, 8.07; P, 8.78.

Example II

A film was cast as follows: One hundred parts of 88% hydrolyzed poly(vinyl alcohol) having a viscosity of 22 centipoises, measured as a 4% aqueous solution at 20° C., was dissolved in 900 parts of water by heating. To the resulting solution was added 20 parts of tris(tetrahydrofurfuryl) phosphate. The resin solution was cast as a 5-mil film on a sheet of single strength glass and dried for one hour at 70° C.

Additional films were cast using the above procedure except for differences in the amount and type of plasticizer. A film containing 40 parts of tris(tetrahydrofurfuryl) phosphate per hundred parts of poly(vinyl alcohol) was prepared, as well as films containing 20 and 40 parts of glycerine, a conventional plasticizer, in place of the tris(tetrahydrofurfuryl) phosphate. No differences between freshly prepared films could be visually observed under the conditions of a standard laboratory atmosphere.

Example III

The relative hardness of poly(vinyl alcohol) films plasticized with tris(tetrahydrofurfuryl) phosphate under various humidity conditions were evaluated as follows: Using the resin solutions prepared in Example II, films having a thickness of 1–2 mils were cast and dried as before. These films were subjected to various humidity conditions at a temperature of 73° F. for a period of 48 hours. The films were rated as to hardness using a rating of 1 for the hardest film, which was very brittle, and a rating of 10 for the softest film, which was very weak. The following data were obtained:

TABLE

| Plasticizer, parts per hundred parts of resin | Relative Humidity at 73° F. | | |
|---|---|---|---|
| | 50% | 0% | 100% |
| 20-tris(tetrahydrofurfuryl) phosphate | 5 | 4 | 5 |
| 40-tris(tetrahydrofurfuryl) phosphate | 6 | 5 | 7 |
| 20-glycerine | 7 | 5 | 10 |
| 40-glycerine | 8 | 7 | 10 |
| No plasticizer | 2 | 1 | 9 |

The films plasticized with tris(tetrahydrofurfuryl) phosphate were softer at 0% and 50% relative humidity than the brittle unplasticized films, while having improved hardness over the soft unplasticized film at 100% relative humidity. At 100% relative humidity the film plasticized with glycerine was even softer than the unplasticized film.

As will be apparent to those skilled in the art, numerous other poly(vinyl alcohol) polymers can be plasticized with tris(tetrahydrofurfury) phosphate to give similar results without departing from the spirit of the invention or the scope of the following claim.

I claim:

Poly(vinyl alcohol) plasticized with tris(tetrahydrofurfuryl) phosphate.

No references cited.

MORRIS LIEBMAN, *Primary Examiner.*